United States Patent [19]
Cortner, Jr.

[11] 3,971,342
[45] July 27, 1976

[54] LIVESTOCK DUSTING BAG

[75] Inventor: William C. Cortner, Jr., St. Joseph, Mo.

[73] Assignee: Dale Alley Co., St. Joseph, Mo.

[22] Filed: May 13, 1975

[21] Appl. No.: 577,013

Related U.S. Application Data

[62] Division of Ser. No. 422,341, Dec. 6, 1973, Pat. No. 3,902,461.

[30] Foreign Application Priority Data

Nov. 27, 1973  Canada .............................. 186782

[52] U.S. Cl. .............................................. 119/159
[51] Int. Cl.² ................. A01K 13/00; A01K 29/00
[58] Field of Search ................................. 119/159

[56] References Cited
UNITED STATES PATENTS 3,364,900  1/1968  Knapp ................................. 119/159
3,821,940  7/1974  Mann ................................. 119/159

Primary Examiner—Hugh R. Chamblee
Attorney, Agent, or Firm—Cushman, Darby & Cushman

[57] ABSTRACT

A self dusting cartridge loading protected livestock applicator comprising at least one inner porous bag having filling means and flexible protective material substantially surrounding and overly covering the bag. The flexible protective material extends below the inner porous bag forming folds which curl upward toward the bottom of the inner porous bag and preferably extend upward with a porous material that contacts and transfers dust from the inner bag to itself and to an animal. The applicator is constructed so that when it is agitated by an animal the guard or protective material cause dust to be dispensed on the agitating animal and at the same time provide some protection to the more vulnerable inner bag.

22 Claims, 7 Drawing Figures

LIVESTOCK DUSTING BAG

This application is a division of my copending application Ser. No. 422,341 filed Dec. 6, 1973, now U.S. Pat. No. 3,902,461, entitled "Livestock Dusting Bag" and is related to my application Ser. No. 110,575, filed Jan. 28, 1971, entitled "Livestock Dusting Bag", now U.S. Pat. No. 3,777,716 issued Dec. 11, 1973.

This invention relates to an applicator for dusting livestock with insecticide powders or dust as the animal passes beneath the applicator.

It is well known that livestock are frequently troubled with various types of insects, such as flies, ticks, lice, grubs, etc., which prey upon them causing irritation which results in interference of the animals' grazing and feeding. This interference can result in a loss of weight, decrease the milk production or impairment of the hide.

In the past there have been several conventional ways this pest problem has been dealt with. One conventional way was to individually treat each animal by hand, which is an expensive method of treatment due to the individual cost of the labor involved. Additional treatments that have also been used are in the form of dust bags which are supported by various means. These dust bags are usually simple burlap type bags, or other more sophisticated bags that use poly type materials around the bag to protect them from moisture. The useful life of such bags has been limited due to the fact that the bag material has a tendency to easily become clogged with dirt, saliva, feet and natural oils that accumulate on the bag when animals come into contact with them.

The invention in my aforesaid copending application overcame the prior art problem as does the present invention which includes some of the same features. Both are improvements over previous dust applicators and each is constructed with an outer layer of heavy flexible material substantially encompassing and overly covering an inner porous bag so that the edges of the outer heavy flexible material extend down and under the inner porous bag forming folds. The fold arrangement acts as a protective guard in two ways.

1. It protects the more vulnerable inner dust carrying bag from the abuse of the cattle agitating the bag and also absorbs or collects much of the foreign matter from the cattle preventing the foreign matter from plugging the porous inner dust carrying bag.

2. It offers protection of the inner dust carrying bag from the elements and due to the heavy outer cover, the inner dust carrying bag is in a sense hanging in deep shade and the sun's ultra violet penetration is greatly reduced. This configuration also offers excellent protection from wind and moisture.

Preferably, the heavy flexible material outer bag cover is lined in the inside from the bottom up for at least part of its height with porous material for receiving and also applying dust to the using animal. This outer bag cover has the feature of exposing a greater dusting area when agitated.

The normal use of the present invention like that in my aforesaid application and patent lends itself to a longer serviceable life than a conventional applicator or bag which comes into contact with moisture, dirt and other clogging materials, as well as the ultraviolet rays of the sun, causing it to rot. Consequently, the improved construction and material composition enable it to be used longer than conventional dust bags. In fact, dust bags made according to the disclosure herein can be reused, as a refilling means is provided for the inner dust bag of the applicator which allows the user to conveniently refill the bag, thus lowering the cost per pound of dust dispensed.

The present invention disclosed herein is unique over the prior art in that it relates to a livestock dusting applicator that is either a saddle bag type or of cone shape and also possesses the unique properties mentioned above and in my aforesaid copending application and patent. In the saddle type two covered bags hang over a rope like a saddle and either can be thrown or inverted over the top of the rope to expose access openings to both bags. In the cone shaped embodiment, the outer bag is of cone shape and its inner bag is of cylinder or cone shape with the inner bag including strap means connecting its top to its central bottom to pull the latter upward and prevent sag thereof. The top of the inner bag is preferably open for filling purposes and closable with a draw string, and its strap means removably connect interiorly at its apex to hanging means of the outer bag. The hanging means sealingly extend through the apex of the outer bag and provide for a single hanging point.

There are many objects and advantages to this new structure over the prior art. These objects and advantages will become more apparent from the following detailed description in connection with the accompanying drawings, in which.

Figure 1:
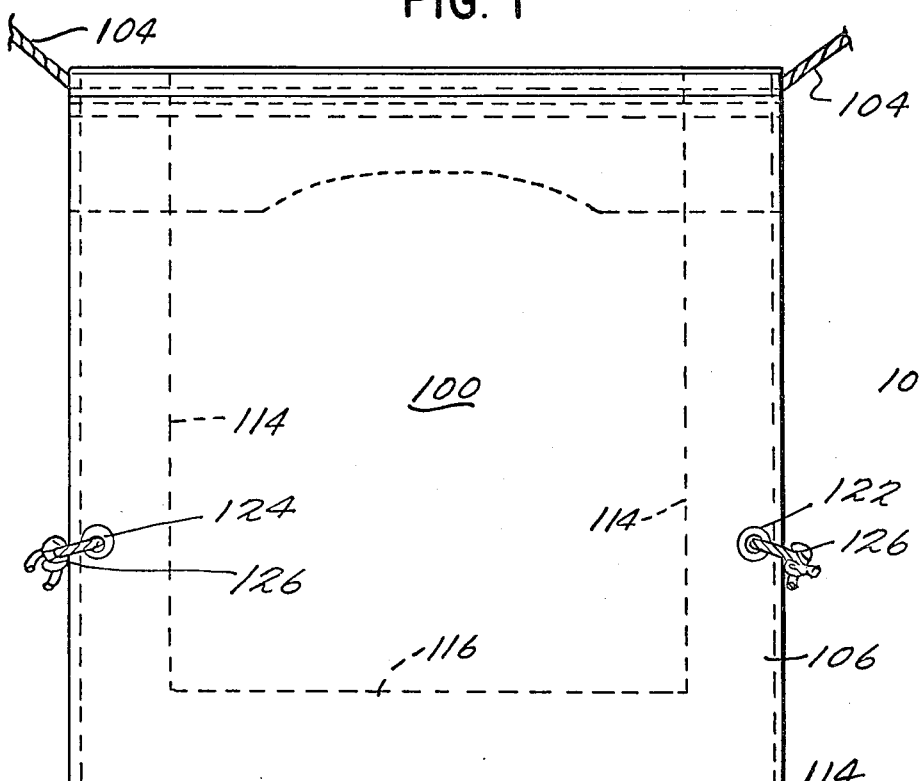
FIG. 1 is a side elevational view of the saddle type bag embodiment of the present invention.
Figure 2:
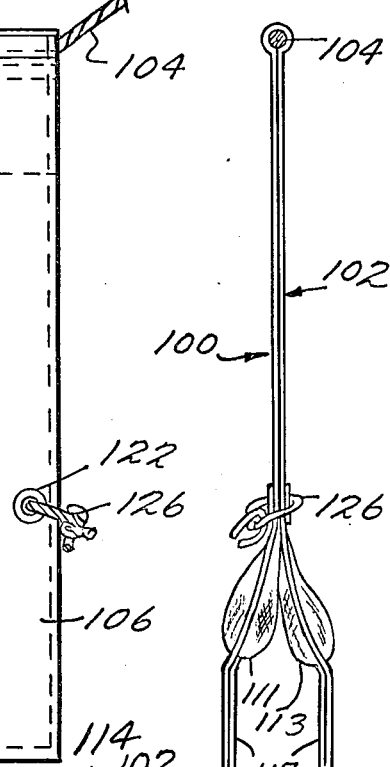
FIG. 2 is an end view of the FIG. 1 bag.

One embodiment of this invention is shown in FIGS. 1–4, and is generally referred to as the "saddle bag" type since it is comprised of two sides 100 and 102 connected at their top to and over a hanging rope 104. Each side has an outer cover 106 that is a single piece which extends from the bottom of one side to its top and over rope 104 and down to the bottom of the other side. Cover 106 may be made of waterproof canvas or duck (e.g., 8 oz. material) which is durable, rugged and can withstand the beating normally given such a dust applicator by livestock. Additionally, each vertical inside wall of cover 106 is lined with a material 108, preferably porous such as burlap, and a second layer of porous material 110, again preferably burlap or polyester netting or other porous plastic preferably of the kind that is non-stretchable so that it will not sag when the bag is filled, which forms with the lining 108 respective inner bags 111 and 113 which have openings 112 and 112' at their upper ends. As apparent from FIGS. 1 and 3, the stitching 114 along the sides of the inner bags 111 and 113 and stitching 116 along the bottom thereof leave a margin or border for protective purposes. The lower inside border 117 consequently extends upwards to the bottom of the respective inner bag 111 or 113. Disposed in the side or end borders 118 and 120, are respective grommets 122 and 124. As shown in FIGS. 1 and 2, when both sides of the bag are down in operable position, a side tie rope 126 is employed to keep the opposite sides 100 and 102 together.

If desired, the weatherproof dust bag of this invention may be used as a throwaway item. That is, once its contents have been used, a new bag may be hung in its place.

Alternatively, since the protection provided by this invention gives the applicator a much longer serviceable life than a conventional bag that rots from moisture and the ultraviolet rays of the sun, refill provisions are desirable.

Figure 3:
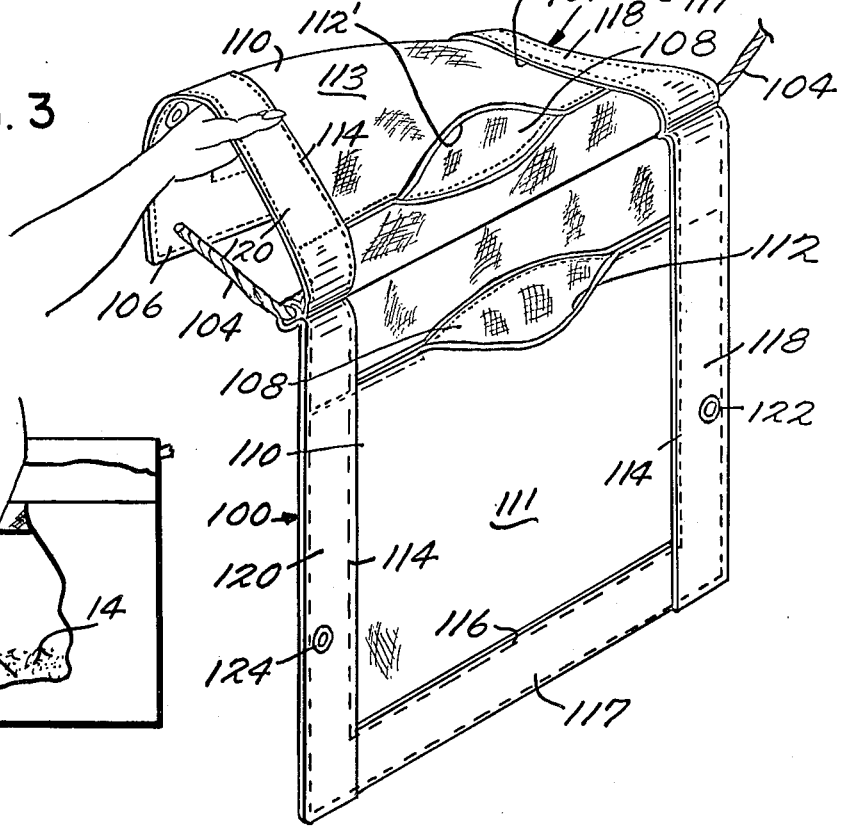
FIG. 3 is a perspective view of the FIG. 1 bag with one side being inverted up and over the rope.
Figure 4:
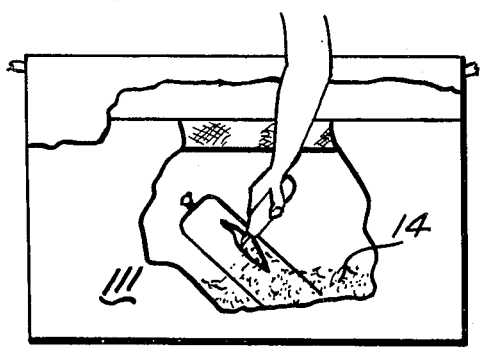
FIG. 4 is a partial cutaway side view of the FIG. 1 bag showing perforation of an insecticide cartridge which has been inserted into one side of the bag.

When it is desired to fill either or both sides 100, 102, one of those sides is lifted up and over the rope as shown in FIG. 3, so as to expose their respective filling openings 112 and 112', into which insecticide powder or dust may be deposited directly or by use of a cartridge which can be placed inside each inner bag 111, 113 through openings 112, 112' respectively and then slit by the operator with a knife to release the dust inside the sides, as shown in FIG. 4. When the sides are both filled to the desired extent, the side which had been flipped over the rope is returned back to its normal position as shown in FIG. 2, and ropes 126 are retied on both sides. Openings 112 and 112' will automatically reclose themselves by mere pressure against one another, though if desired a closure or fastener may be employed especially if loss of dust through the openings becomes a problem. That is, for example pressure adhering fabrics such as Velcro as disclosed in Mestral U.S. Pat. No. 2,717,437 or any other type closure, may be used.

In the saddle type dust bag of FIGS. 1–4, the two inner bags 111 and 113, one on each inside wall of the outer cover 106, hang or saddle over the sewed-in top hanging rope 104. This construction affords a safety feature, as two separate bags are incorporated. That is, if one side or bag fails, the assembly is still functional.

In operation the saddle bag type livestock dust applicator of the present invention is hung so that the lower edge of inside border 117 of each side 100, 102, are six to eight inches below the back line of the animal to be dusted. As the animal passes under the applicator, contact is first made with, for example, the outer cover 106 of side 100 pushing the inner side 110 of inner bag 111 against inner side 110 of inner bag 113, both of which contain insecticide dust. This causes dust to be discharged through the porous inner walls 110 of inner bags 111, 113 and thus applied to the animal passing under the applicator. As the animal continues to pass under the applicator it contacts inner bag 113 and its inner border 117 to cause further discharge of dust from inner bag 113. Thus, while the animal is under the applicator, dust will be discharged from both inner bags 111 and 113. Dusting of an animal is also accomplished when it stands beside the bag and bucks and tosses it with its head. It will be realized that the arrangement of the dust bag of the present invention protects the inner bags 111 and 113 from much of the stress and wear resulting from animal contact since, as most blows from the animal's horns or head are usually directed upwardly, the lower ends of outer cover 106 corresponding to inside border 117, will conform to the bottom portion of inner bags 111 and 113 and absorb the blows from the animals. Moreover, when an animal passes under the dust bag, the leading portion of outside cover 106 corresponding to inside border 117 first comes into contact with the animal and folds under inner bags 111 and 113 to absorb most of the oil, dirt and other clogging materials and functions to keep inner bags 111 and 113 out of contact with the animals.

Figure 5:
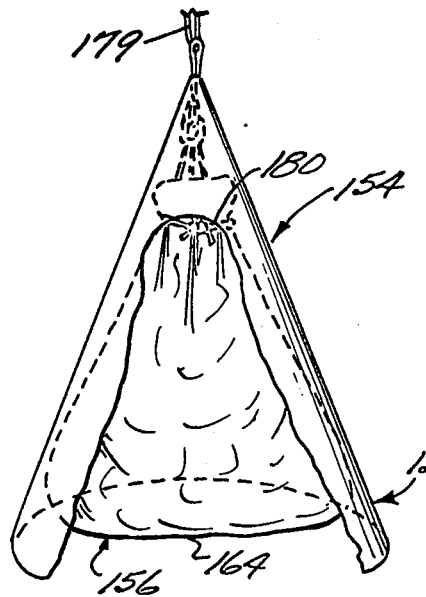
FIG. 5 is a partially cutaway pictorial view of another embodiment of the invention showing an outer cone-shaped protective bag and an inner cone-shaped dusting bag.
Figure 6:
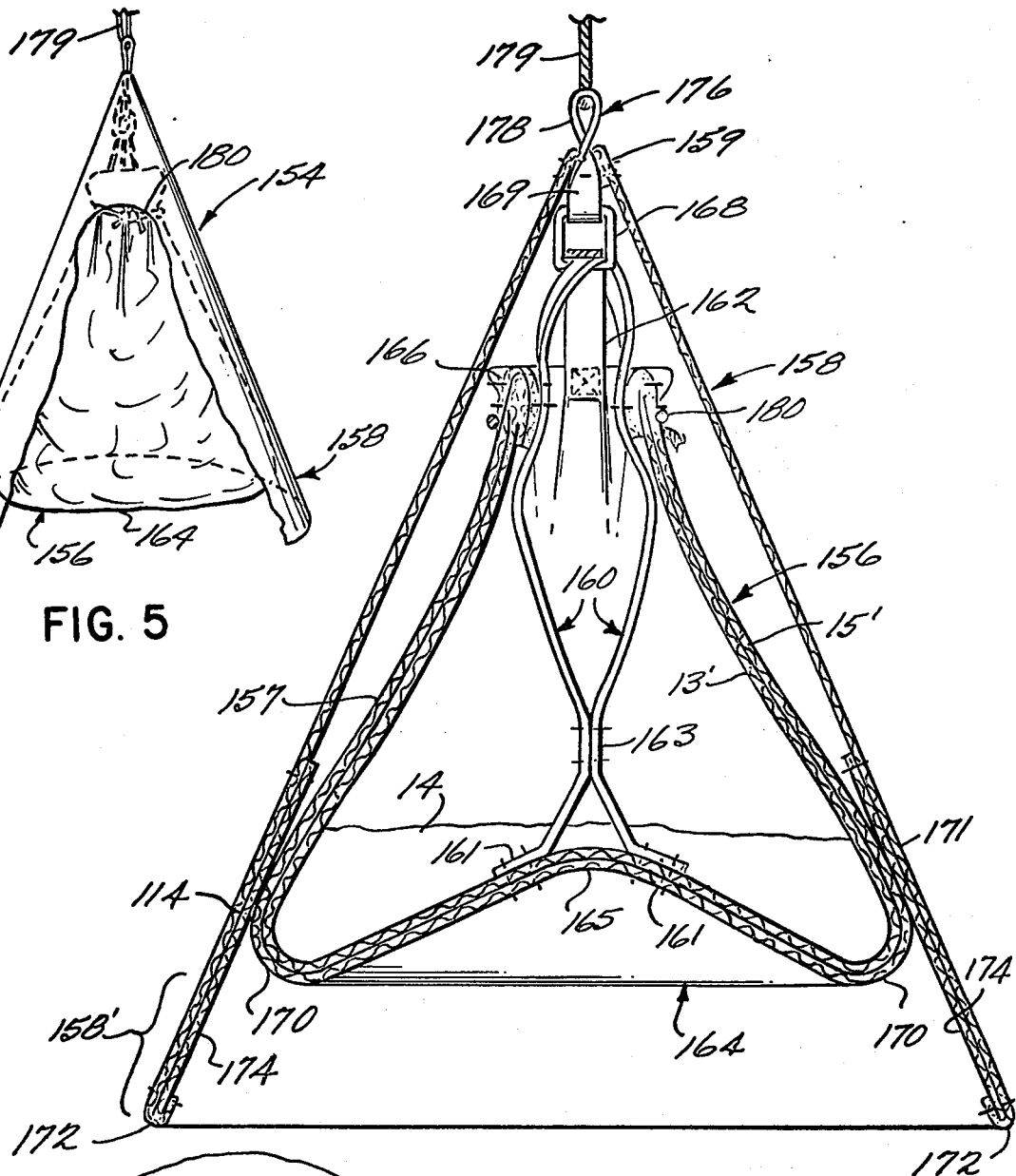
FIG. 6 is a cross-sectional side view of the embodiment of FIG. 5 showing the manner of connection between the inner and outer bags and the support straps.
Figure 7:
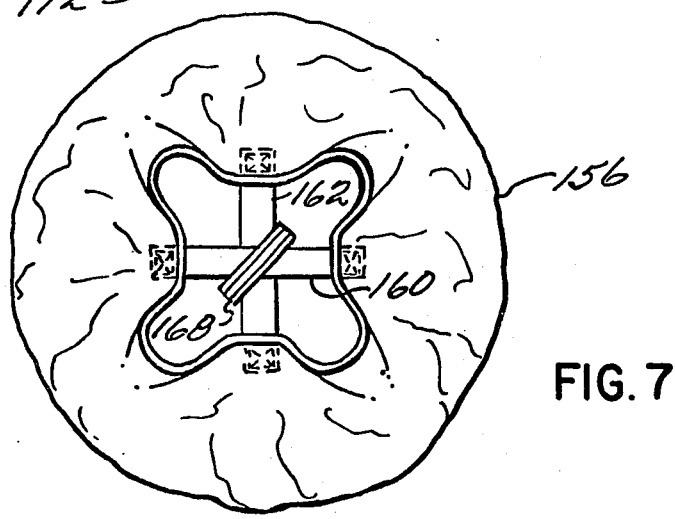
FIG. 7 is a top plan view of the inner cone-shaped dusting bag of the embodiment of FIG. 5 showing the support straps.

Another embodiment of my unique, cartridge loading livestock dusting bag or applicator 154, as shown in FIGS. 5, 6 and 7, includes an inner insecticide storing and dusting bag 156 filled with an insecticide dust or powder 14, and having an outer protective bag 158 generally cone-shaped in configuration.

The inner bag 156 may be made from a single layer of burlap fabric or similar porous type of material or it may be made of two porous layers, for example, two layers of burlap or an inner layer of burlap 13' and an outer layer 15' of porous plastic such as a polyester netting woven material preferably of the kind that is non-stretchable so that it will not sag when filled. Bag 156 has a circular bottom 164 with a diameter that is preferably but not necessarily large enough to dust an area at least the width of the animal to be dusted. An exemplary diameter is 18 inches. The side portion 157 can be cylindrical or cone-shaped as long as it can be drawn into the upper portion of the outer cone-shaped bag 158. The bottom 164 and side portion 157 can be secured together by any suitable means such as sewing or may be made as one piece in any desired manner.

Referring more particularly to FIG. 6, the inner bag 156 is supported by strap means 160 and 162 which are sewn to the inside of the inner dust bag 156. The strap means 160 is attached to the bottom portion 164 of the inner bag 156 at two points 161 slightly away from the central area 165 of the bottom. The strap means 160 then extend upwards as hump shaper straps and are sewn together approximately at the center portion 163 of the inner bag 156 and continue to extend upwards toward the open end of the inner bag and are sewn to the inside of the upper portion 166 at opposing sides of the inner bag and then extend out through the upper portion and are attached to a ring 168. Strap means 160 is preferably a single strap that extends from the central bottom area 165 of the inner bag to one side of the top 166 thereof, through ring 168 to the opposite side of top 166 and back down to the central bottom area 165. Strap means 162 on the other hand is a short loop starting and ending at the upper portion 166 of the inner bag, being sewn thereto on either the inside or outside but displaced 90° from the upper portions of the strap means 160 so as to evenly support the inner bag 156. The strap means 162 extends upward out of the top portion 166 of the inner bag in the same manner as strap means 160, and is connected to the ring 168 to thereby support the inner bag.

Ring 168 is preferably of the split-ring side-overlap type instead of being a continuous solid square ring. That is, the ring is split in two but its opposite ends overlap in a spaced side-by-side manner as shown in FIG. 7. This allows each of the straps 160 and 162 to be pre-sewn to the inner bag 156 and slipped into ring 168. The ring can also be slipped into the inner loop 169 or the hanging strap 176 which is sealingly secured to the apex of the outer bag 158 as more fully discussed below. This manner of coupling allows a user to replace the inner dusting bag or the outer protecting cover if one or the other has some additional use life left, obviously affording a savings as compared to purchasing a totally new bag.

The manner in which the straps 160 and 162 are sewn to the inner bags 156 causes the central bottom area 165 to be lifted up in relation to the outer edges 170 of the bottom 165 so that when the inner dust bag is filled with an insecticide, dust or powder 14, the powder will lay, as seen from the bottom at least, in a generally ring or doughnut-shaped configuration about the center 165 of the inner dust bag 156. That is, strap assembly 160 is a shaper strap that pulls up the inverted cone 165 in the bottom of the inner bag 156 causing the dust contents to shape itself into a ring. Since strap 160 also attaches to the top of the dust bag, it helps stabilize the whole dusting bag applicator. Straps assembly 162 is also a stabilizer which along with strap 160 causes the dust bag to hang level. The effect of the dusting ring is to cause the inner bag to maintain a substantially increased dusting area since the powder 14 is forced to the outer edges of the bag 156, thus expanding it. This gives the total assembly the capacity to block lanes or doorways through which livestock are moved and hence forced to use the duster.

Straps 160 and 162 cause not only two attachment points at the bottom of the inner dust bag making the void possible but also attach at four points separated 90 degrees around the top which allows the inner dust ring to maintain a horizontal position with the ground. Also the four point attachment eliminates the dust from shifting from one side of the bag to the other which would cause a rupture effect and is undesirable.

The outer cone-shaped protective bag 158 has an annular guard or skirt portion 158' which extends below the inner bag bottom 164 up to at least half the diameter of the bag bottom 164 to help operate on the livestock as discussed above in connection with the first embodiment. A suitable lesser length for skirt 158' may be 4 or 5 inches for an 18 inch diameter of inner bag bottom 164. As shown, outer bag 158 includes an outer wall 171 which is inwardly and upwardly turned at its lower edge portions 172 to provide drip means. This prevents water which would otherwise accumulate on the lower inner portion or wall 174 of the protective outer bag 158 from causing moisture to be transferred to the inner bag 156 and thereby substantially preventing the flow of insecticide out of the bag because of a caking and hardening of the insecticide in the porous material from which the inner bag is constructed. The outer wall 171 may be constructed of the same material as outer wall 106 in FIG. 2. The inner wall or portion 174 of the outer cone-shaped bag 158 preferably is a lining of burlap or similar porous material like inner wall 110 of FIG. 2 and is sewn at its upper and lower edges to the outer bag and positioned so as to rub against the inner bag 156 thereby causing increased agitation of the material which causes a greater dispensing of the insecticide 14. In addition, this inner portion 174 accumulates insecticide 14 and distributes it on an animal moving under the bag and thereby also increases substantially the area covered by the insecticide. Of course, the inner wall portion 174 may be extended to the full height of outer wall 171 is desired.

The outer bag 158 is sewn at its upper portion or apex 159 to a hanging strap means 176 which interiorly includes loop 169 attached to an opposite side of the ring 168 from that of the inner bag 156. The hanging strap means 176 extends through a tightly sewn and hence weatherproof sealed opening at the apex of the outer bag 158 and provides an exterior loop 178 from which the cone-shaped livestock dusting bag 154 can be supported at a single point as by rope 179. Of course, if desired, the hanging strap 176 may be two straps separately sewn to the inside and outside of bag 158.

In addition to the above-described features of the cone type dusting bag shown in FIGS. 5-7, it has similar advantages to the previously described embodiment, such as being refillable, easily loaded while suspended in position, and allows the use of the cartridge filled with insecticide as may be utilized with other embodiments.

Furthermore, however, the cone-shaped dusting applicator of this invention provides a larger assembly in general than a corresponding bag of the FIGS. 1-4 type since the cone bag is symmetrical from any point of view, so that when it is hung in the open it is more noticeable to livestock and presents a larger object to butt or work. The larger bottom diameter also exposes more surface dust dispensing area, while still being completely protected from moisture, wind and sun since the cone covering bag 158 extends substantially below the inner dust carrying bag 156. Also, only one hanging rope is necessary for the cone type bag, which is not only a savings from the standpoint of labor but also as to material. Further it provides for fast and easy installation and eliminates any need for a level hanging arrangement.

It is also to be noted that in the single point attachment structure of the cone type applicator the strap attachment takes all the weight of the inner bag 156 even though the straps pass through the outer protective cone bag 158 and does so im such a manner that a positive weather seal is maintained without transferring any of the weight to that outer bag 158.

As previously explained, inside the protective cone cover 158, the strap attachment structure 169 is connected to the straps 160 and 162 of the inner bag 156 by a detachable split metal ring or square coupler 168. This arrangement of the attachment assembly including the straps and split square coupler 168 causes the inner dust bag 156 and outer cover 158 to become independent of each other if necessary. Hence in the case of excessive wear of the inner bag or outer cover, a replacement thereof can be installed. An alternative arrangement to use of the metal ring 168 and interior loop strap 169 is to sew straps 160 and 162 directly to the outer cone cover 158, for example to the inside thereof with the exterior hanging loop 178 remaining or alternatively one or both straps 160 and 162 can be sewn through the apex of the outer cover 158 and form the outer hanging loop means instead of the separate strap hanging assembly 176. Of large importance in any case is the fact that any of the arrangements allow for top loading of the inner dust bag, as now explained, though of course the direct sewn strap arrangement does not allow for ready replacement of the inner bag or outer cover as does ring 168.

To load the inner bag 156, the outer cover is lifted up out of the way. Then draw string 180, which surrounds the top of inner bag 156, is untied and the top is opened up by pulling the two nearest parts of the straps 160 and 162 in opposite directions through square coupler 168. This causes the largest possible diameter to open and allows dust to be more readily placed inside, either in loose form or preferably in cartridge form as above described. Draw string 180 which may weave from inside to outside all around the top of inner bag 156 is then drawn tight and retied. Of course, filling of the inner bag can be accomplished instead after first decoupling it from square 168. Because of the strap connections to a single point at top and their pull up of the bottom central area 165, the dust is leveled and shaped in a ring around area 165, preventing central bag sag.

Inner bag 156 may be formed of as many vertically extending sections or panels as desired. For example bag 156 may be made of two half sections or panels sewn together. However, such a two-piece construction may for some size bags leave the panel width or circumference too great for one or the other of the panels to carry the dust load and hence bag rupture thereof might occur. A more preferred arrangement in such cases is to use more than two panels, especially a four-piece (panel quarters) four-seam construction which reduces the distance between the seams which are stronger because they lap eliminating any rupture.

Thus it has been shown that all of the objects and advantages of this invention heretofore discussed have been carried forth by the construction and operation of the novel livestock dusting applicators above described. Further objects and advantages, and even other embodiments of this application will become apparent to those of ordinary skill in the art upon reading the foregoing disclosure. However, it is to be understood that such modifications and variations are considered to be within the purview and scope of the present invention as defined by the appended claims.

What is claimed is:

1. A protected self-dusting livestock dust applicator comprising:
   a cone-shaped flexible weatherproof outer cover having an apex at one end and an open end at the opposite end,
   an inner porous storing and dusting bag having a closed bottom and an open top for filling purposes and being disposed inside said outer cover,
   means for elevating the central area of said inner bag bottom substantially relative to the outer edge of said inner bag bottom to prevent central bag sag when dust is disposed in the bag and to cause the dust to spread to said outer edge around the bag bottom,
   interior means connected between the upper end of said inner bag and apex of said outer cover for hanging the inner bag from a single point within the outer cover and to a height such that the said outer edge of the inner bag bottom is substantially above the said open end of the outer cover, and
   exterior means connected at the apex of said outer cover for exteriorly hanging said applicator from a single point.

2. An applicator as in claim 1 wherein said elevating means comprises strap means connected between the said central area of said inner bag bottom and the said top thereof.

3. An applicator as in claim 2 wherein said strap means is a single strap having its opposite ends connected to said central bottom area and extending above the said top of the inner bag as an upstanding loop to form part of said interior means and being connected to opposite sides of said top to cause said central area to be substantially elevated relative to the said bottom outer edge of the inner bag.

4. An applicator as in claim 3 wherein said interior means further includes a second strap connected to the inside of the apex of said outer cover and forming a depending loop, and means for detachably coupling said depending and upstanding loops.

5. An applicator as in claim 4 wherein said second strap extends through said outer cover apex in a weather-proof manner to form a hanging loop as said exterior means.

6. An applicator as in claim 5 wherein said detachable coupling means is a split coupler having four sides two opposite ones of which are at least as long interiorly as the width of said depending and upstanding loops respectively, so that said inner bag hangs level.

7. An applicator as in claim 6 wherein said outer cover includes an outer wall which extends the full height of the cover and further includes a porous inner wall which extends from at least near the said open end of the cover upwards adjacent said outer wall for at least a portion of said height.

8. An applicator as in claim 7 wherein said outer wall turns inward and upward to form water drip means to prevent moisture from reaching said inner wall or said inner bag.

9. An applicator as in claim 7 wherein said outer wall is made of canvas-like material.

10. An applicator as in claim 7 including a draw string for closing said open top of said inner bag after it is filled with said dust.

11. An applicator as in claim 1 wherein said inner bag is composed around its circumference of at least several wall panels extending from top to bottom and seamed together to provide sufficient strength to prevent bag rupture by the weight of the dust.

12. A protected self-dusting livestock dust applicator comprising:
    a cone-shaped flexible weatherproof outer cover having an apex at one end and an open end at the opposite end,
    an inner porous storing and dusting bag having a closed bottom and a closeable opening for filling purposes and being disposed inside said outer cover,
    means for preventing sag of the central area of said inner bag bottom substantially relative to the outer edge of said inner bag bottom when dust is disposed in the bag,
    means connecting said inner bag to said outer cover for hanging the inner bag within the outer cover to a height such that the said outer edge of the inner bag bottom is substantially above the said open end of the outer cover, and
    exterior means connected at the apex of said outer cover for exteriorly hanging said applicator from a single point.

13. An applicator as in claim 12 in combination with at least one cartridge of said dust.

14. An applicator as in claim 12 wherein said sag preventing means includes means for elevating the central area of said inner bag bottom relative to the outer edge thereof to cause said dust when disposed in said inner bag to spread toward the said outer edge around the bag bottom.

15. An applicator as in claim 12 wherein the said closeable filling opening in said inner bag is in the top thereof.

16. An applicator as in claim 12 wherein said connecting means is between the upper end of said inner bag and the inside apex of said outer cover for single point hanging of the inner bag therewithin.

17. A protected self-dusting livestock dust applicator comprising:
   two inner porous storing and dusting bags having bottoms and facing inner sides for dispensing dust and having respective top portions with respective filling access openings,
   outer cover means of flexible waterproof material substantially overly covering and connected to the outer sides of said bags to connect the bags together and form an inverted U-shaped applicator which provides protection to said inner bags from use by livestock including mishandling thereby and from foreign matter and moisture,
   said outer cover means being folded over the ends and bottom of each bag to form a substantial inside border along the ends and bottom of each of said bags; and
   hanging means having a substantial horizontal portion secured to said cover means along the inside top of said inverted U-shaped applicator whereby either of said bags may be turned over said horizontal portion of said hanging means to dispose said bag inner sides outwardly and thereby gain ready access to both of said filling openings.

18. An applicator as in claim 17 wherein at least the said facing inner sides of said bags are of burlap.

19. An applicator as in claim 17 wherein said outer cover means is a single inverted U-shaped cover of heavy flexible weatherproof material that can withstand livestock abuse and protects said inner bags.

20. A protected self-dusting livestock dust applicator comprising:
   two inner porous storing and dusting bags having bottoms and facing inner sides for dispensing dust and having respective portions with respective filling access openings,
   outer cover means of flexible waterproof material substantially overly covering and connected to the outer sides of said bags to connect the bags together and form an inverted U-shaped applicator which provides protection to said inner bags from use by livestock including mishandling thereby and from foreign matter and moisture,
   said outer cover means being folded over the ends and bottom of each bag to form a substantial inside border along the ends and bottom of each of said bags;
   hanging means having a substantial horizontal portion secured to said cover means along the inside top of said inverted U-shaped applicator whereby either of said bags may be turned over said horizontal portion of said hanging means to dispose said bag inner sides outwardly and thereby gain ready access to both of said filling openings.

21. An applicator as in claim 20 including respective means for closing and opening said filling openings in said two dusting bags.

22. An applicator as in claim 20 in combination with at least one cartridge of said dust.

* * * * *